United States Patent [19]

Satou

[11] Patent Number: 4,532,571
[45] Date of Patent: Jul. 30, 1985

[54] CIRCUIT BREAKER

[75] Inventor: Kouzou Satou, Mie, Japan

[73] Assignee: Tokyo Shibaura Denki Kabushiki Kaisha, Kawasaki, Japan

[21] Appl. No.: 545,265

[22] Filed: Oct. 25, 1983

[30] Foreign Application Priority Data

Nov. 12, 1982 [JP] Japan ................................ 57-198602

[51] Int. Cl.³ .............................................. H02H 3/08
[52] U.S. Cl. ........................................ 361/93; 361/31; 361/97
[58] Field of Search ................... 361/93-97, 361/31, 30, 98; 310/DIG. 3

[56] References Cited

U.S. PATENT DOCUMENTS

| 2,957,109 | 10/1960 | White et al. | |
|-----------|---------|--------------|--------|
| 3,914,667 | 10/1975 | Waldron | 361/94 |
| 4,131,929 | 12/1978 | Moran | 361/97 X |
| 4,250,532 | 2/1981 | Davis | 361/96 |
| 4,425,596 | 1/1984 | Satou | 361/93 |

Primary Examiner—Patrick R. Salce
Attorney, Agent, or Firm—Oblon, Fisher, Spivak, McClelland & Maier

[57] ABSTRACT

A circuit breaker with a high linearity is provided which detects a current in a main circuit in a low current region by means of a current transformer, while the current in a high current region is detected by a current detector using a Hall element.

8 Claims, 17 Drawing Figures

F I G. 6B
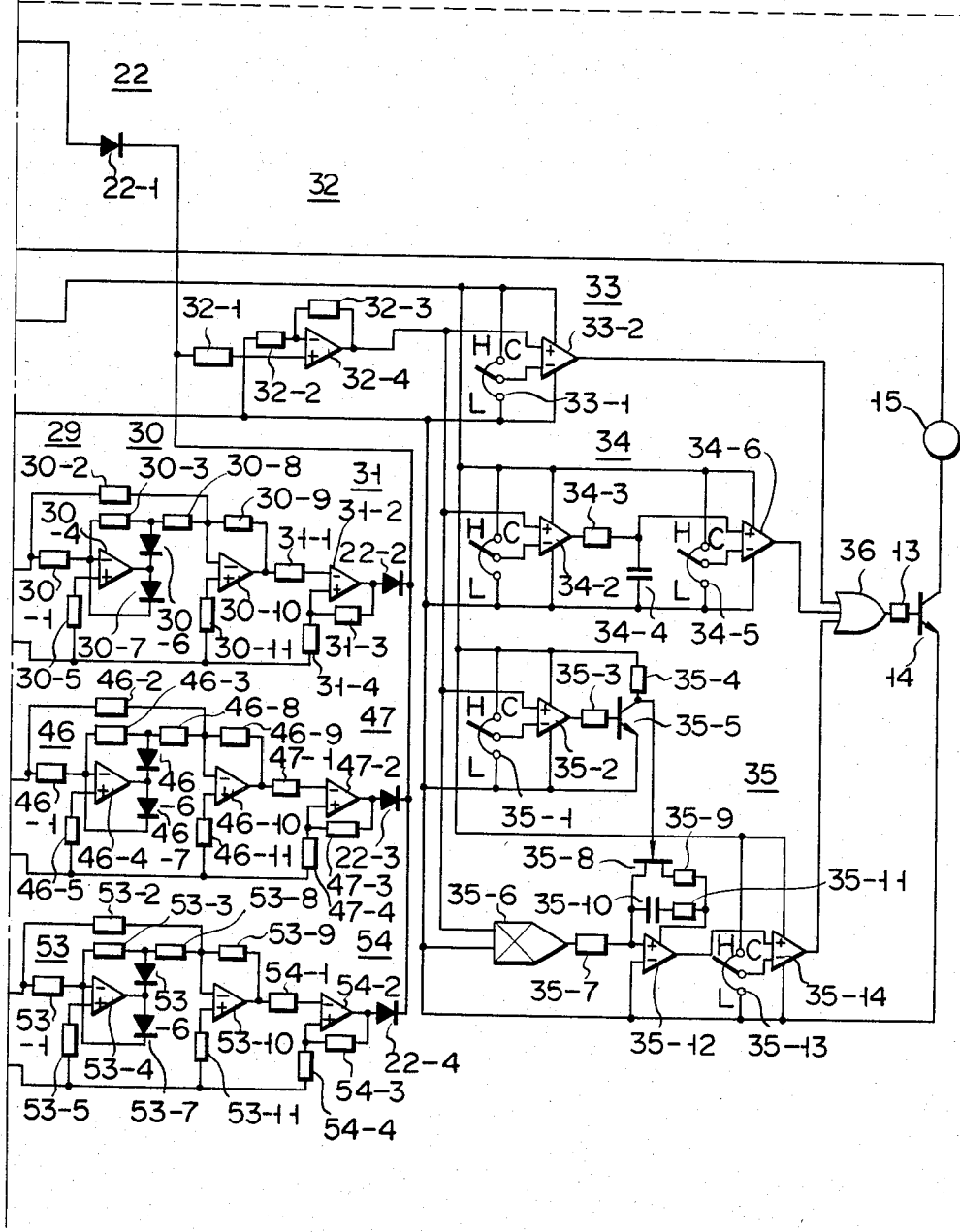

F I G. 7B
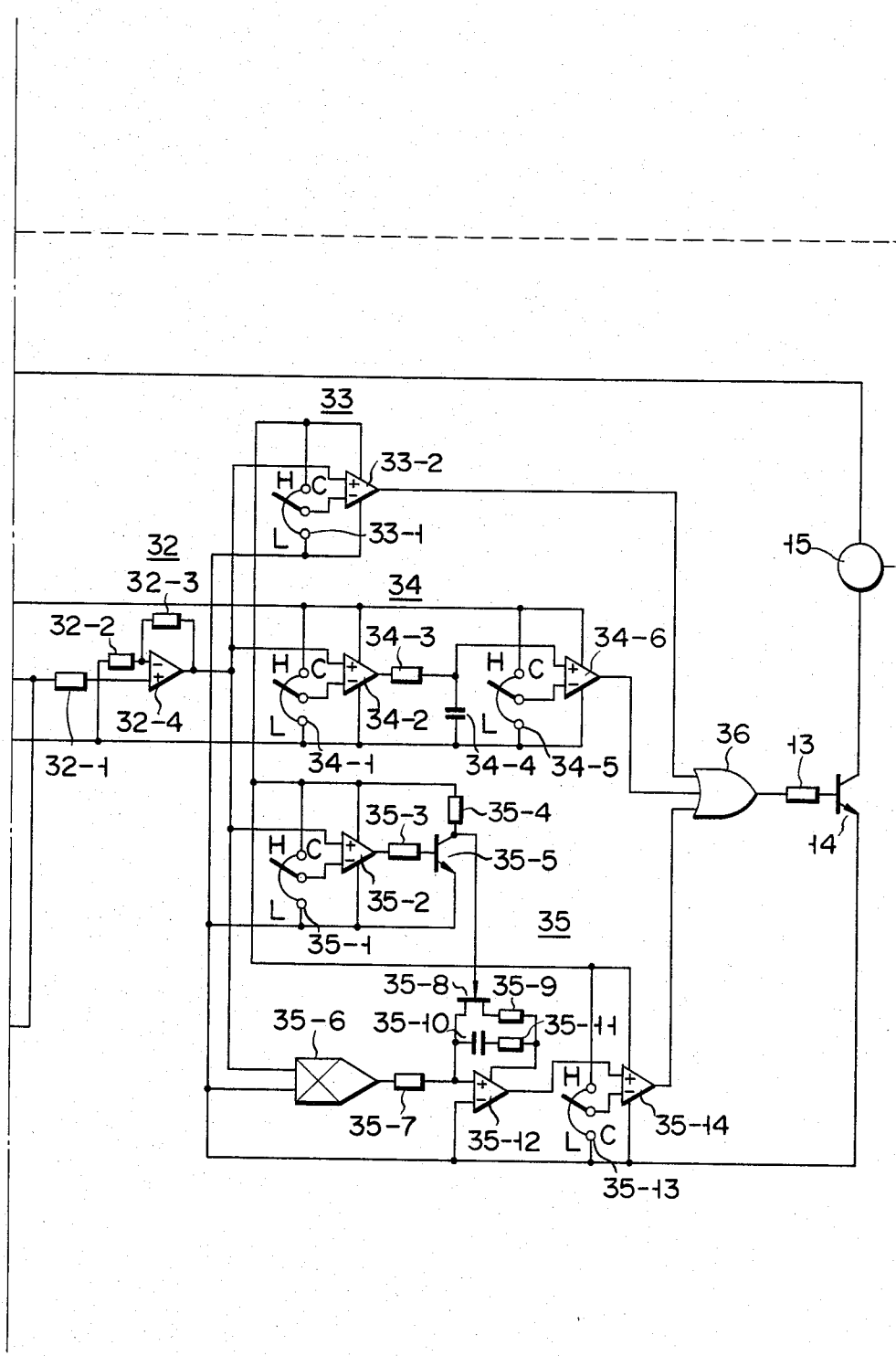

CIRCUIT BREAKER

BACKGROUND OF THE INVENTION

This invention relates to a circuit breaker with an overcurrent tripping circuit.

In a conventional circuit breaker, an output from a current transformer connected to a main circuit is full-wave rectified. The rectified output is used for detecting signal for an overcurrent, and also for energizing a tripping circuit and an overcurrent detecting circuit. For keeping the energizing voltage for the overcurrent detecting circuit at a constant value, the full-wave rectified output from the rectifier is converted into a DC current by a smoothing circuit using a capacitor, a resistor, a constant voltage diode, etc. The terminal voltage across the constant voltage diode is applied for a power source of the overcurrent detecting circuit. Approximately, 15 volts, for example, are required for the terminal voltage of the constant voltage diode. To obtain this voltage, a turn ratio of the current transformer must also be large. With this arrangement, when the main circuit current becomes large, the output voltage of the current transformer also becomes excessively large and therefore the voltage drop across the resistor connected in series to the constant voltage diode is large. The result is the increase of load of the current transformer, power consumption and the size of the current transformer. For example, when the circuit breaker is applied for the wiring, a space for the current transformer is limited, providing an insufficient capacity of the current transformer. This results in the deterioration of a linearity characteristic in the detection of a large current of the main circuit. A series circuit of the constant voltage diode and the resistor is large in the power consumption and the device size, because it is used for the power source circuit of the tripping device. If short-circuiting trouble occurs in the load, an overvoltage is developed in the output winding of the current transformer. This requires a high tension surge absorber across the output winding, and a high voltage withstanding for the capacitor in the rectifier circuit. This is a cause to the increase of the cost to manufacture.

The detected output of the current transformer is used for both the current detecting signal and the power source of the circuit breaker. For this reason, particularly a characteristic variation of the constant voltage diode due to temperature change appears as a variation of the detected signal. As a consequence, an accuracy of the circuit breaker operation is degraded.

SUMMARY OF THE INVENTION

Accordingly, an object of the present invention is to provide a compact and economical circuit breaker which is capable of keeping a good linearity on the current detection over a wide range of the current variation in the main circuit, eliminating the generation of an overvoltage in the large current region of the main circuit.

To achieve the above object, the present invention uses a current transformer for the current detection of a circuit breaker in the small current region and a Hall element for the current detection in the large current region.

DETAILED DESCRIPTION OF THE PREFERRED EMBODIMENTS

Figure 1A:
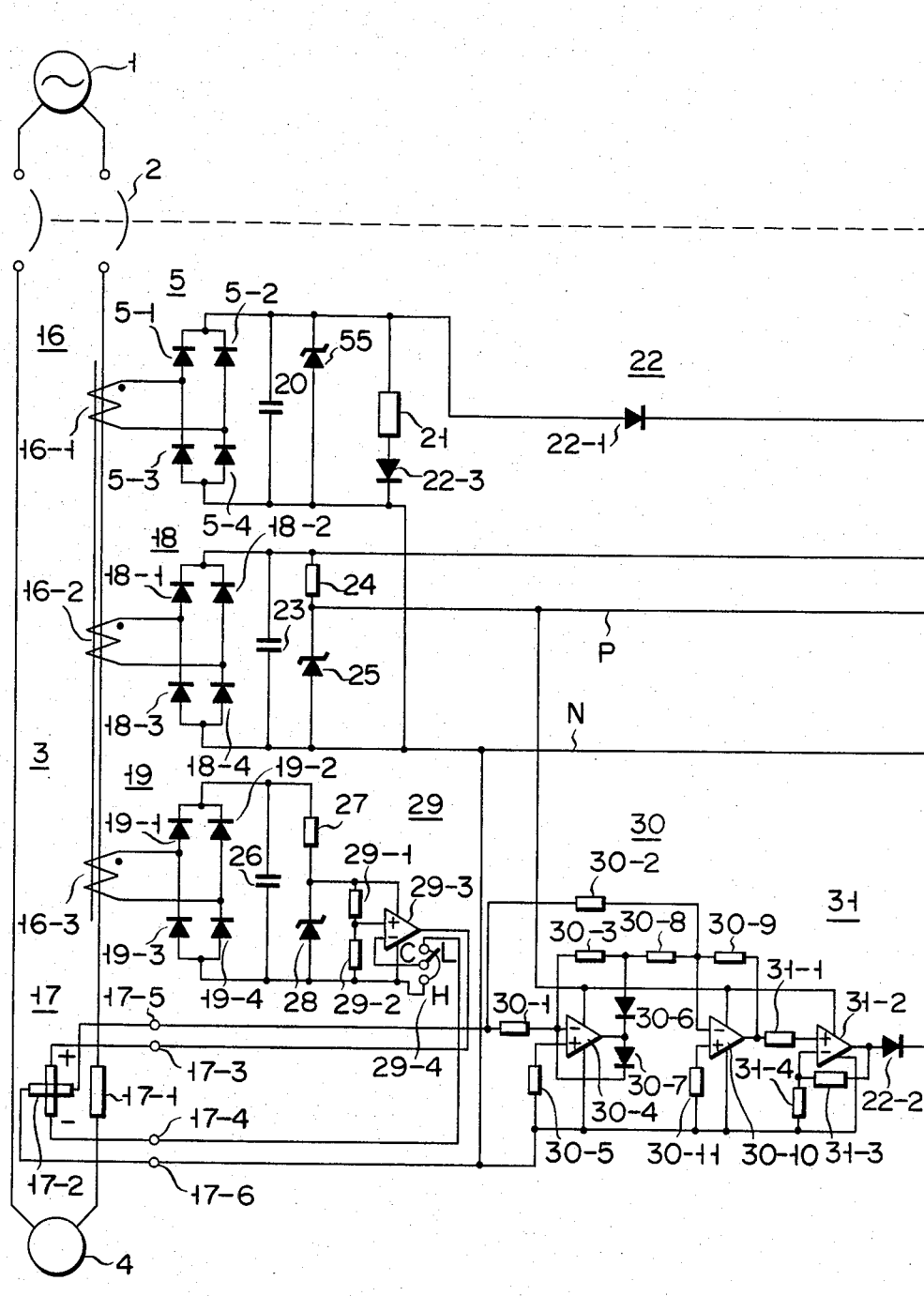
FIGS. 1A, 1B show a circuit arrangement of an embodiment of a circuit breaker according to the present invention.
Figure 1B:
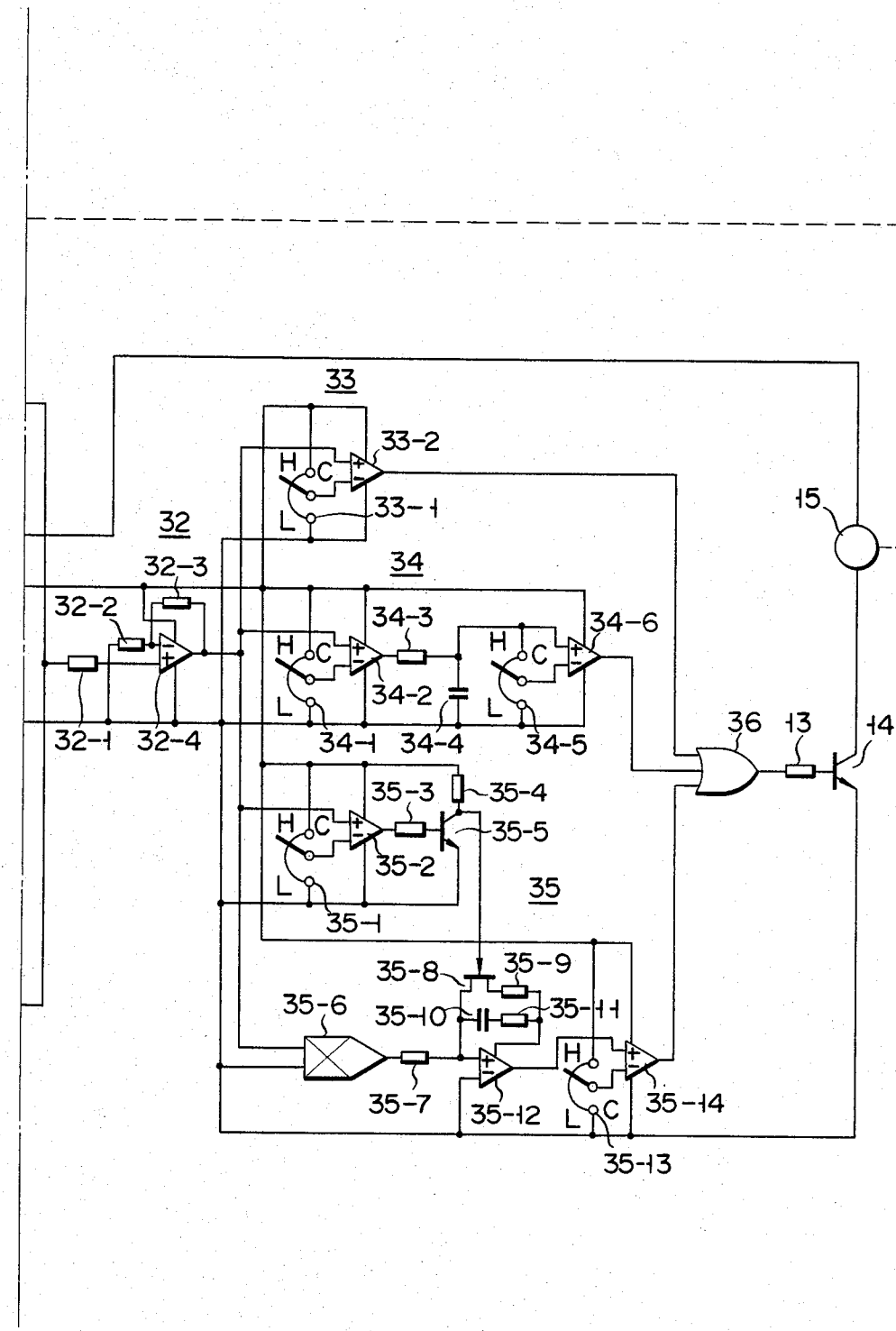

Referring to accompanying drawings, particularly FIGS. 1A, 1B there is illustrated an embodiment of a circuit breaker according to the present invention. In the figure, a load 4 is connected to an AC single phase power source 1 through a circuit breaker contact 2 and a main circuit 3. The circuit breaker contact 2 is driven for circuit breaking by a tripping coil energized upon the energization of a transistor 14 connected at the base to an OR circuit 36 through a resistor 13.

The main circuit 3 is coupled with a primary conductor of a current transformer 16 with three output windings 16-1 to 16-3. The main circuit 3 is further connected to a bus 17-1 with a clad insulation for a current detector 17. The current detector 17 is composed of the bus 17-1 with a clad insulation and a Hall element 17-2.

The terminals of the first output winding 16-1 are connected across AC input terminals of a full-wave rectifier 5 composed of four diodes 5-1 to 5-4. The terminals of the second output winding 16-2 are connected across AC input terminals of a full-wave rectifier 18 composed of diodes 18-1 to 18-4. The terminals of the third output winding 16-3 are connected across AC input terminals of a full-wave rectifier 19 composed of four diodes 19-1 to 19-4. A parallel circuit of a capacitor 20 and a constant voltage diode 55 is connected across the DC output terminals of the full wave rectifier 5. A series circuit composed of a resistor 21 and a diode 23-3 in a select circuit 22 is also connected across the DC output terminal. A positive terminal of the rectifier 5 is connected to one end of a resistor 32-1 via the diode 22-1, while a negative terminal of the rectifier 5 is connected to a negative line N.

A capacitor 23 is connected across the DC output terminal of the rectifier 18, and is connected in parallel with a series circuit of a resistor 24 and a constant voltage diode 25. The positive terminal of the rectifier 18 is connected to one end of a tripping coil 15. A node between the resistor 24 and the constant voltage diode 25 is connected to a positive line P, while a negative terminal thereof is connected to the negative line N.

A capacitor 26 and a series circuit including a resistor 27 and a constant voltage diode 28 are connected across the DC output terminals of a rectifier 19, as shown. Resistors 29-1 and 29-2 in a constant current circuit 29 are connected in series between the terminals of the constant voltage diode 28. Further, the power source terminals of an operational amplifier 29-3 are connected across the constant voltage diode 28. The noninverting input terminal of the operational amplifier 29-3 is connected to a node between the resistors 29-1 and 29-2, while its inverting input terminal is connected to a sliding terminal of a variable resistor 29-4. The output terminal of the operational amplifier 29-3 is connected to a plus (+) input terminal of a Hall element 17-2. The minus (−) input terminal of the Hall element 17-2 is connected to an L output terminal of the variable resistor 29-4. An H output terminal of the variable resistor 29-4 is connected to the minus (−) power terminal of the operational amplifier 29-3.

One of the output terminals of the Hall element 17-2 is connected to the ends of resistors 30-1 and 30-2 in the full wave rectifier 30. The other output terminal of the Hall element 17-2 is connected to the negative line N and to the ends of resistors 30-5, 30-11 and 31-4. Resistors 30-3 and 30-8 are connected in series between the other ends of the resistors 30-1 and 30-2. A node between the resistors 30-1 and 30-3 is connected to the inverting input terminal of an operational amplifier 30-4. The noninverting input terminal of the operational amplifier 30-4 is connected to the other end of the resistor 30-5. The output terminal of the operational amplifier 30-4 is connected to a node between the resistors 30-3 and 30-8 via the diode 30-6, and further to the inverting input terminal through a diode 30-7.

A node between the resistors 30-2 and 30-8 is connected to the inverting input terminal of an operational amplifier 30-10. The noninverting input terminal of the operational amplifier 30-10 is connected to the other end of the resistor 30-11. The output terminal of the operational amplifier 30-10 is connected to the inverting input terminal thereof through a resistor 30-9, and further the noninverting input terminal of an operational amplifier 31-2 via a resistor 31-1 in the amplifier circuit 31. The inverting input terminal of the operational amplifier 31-2 is connected to the other end of a resistor 31-4. The output terminal of the operational amplifier 31-2 is connected through a resistor 31-3 to the inverting input terminal of the operational amplifier 31-2, and further connected to the noninverting input terminal of the operational amplifier 32-4 through a diode 22-2 and a resistor 32-1 in the amplifier circuit 32. The inverting input terminal of the operational amplifier 32-4 is connected through a negative line N via a resistor 32-2, and via a resistor 32-3 to the output terminal of the same.

The output terminal of the operational amplifier 32-4 is connected to the noninverting input terminals of operational amplifiers 33-2, 34-2 and 35-2, and to one of the input terminals of a squaring device 35-6. The positive and negative power source terminals of each of the amplifiers 33-2, 34-2 and 35-2 are respectively connected to the positive and negative lines P and N. Further, variable resistors 33-1, 34-1 and 35-1 are connected in parallel between the positive and negative lines P and N. The sliding terminals C of the variable resistors 33-1, 34-1 and 35-1 are respectively connected to the inverting input terminals of the amplifiers 33-2, 34-2 and 35-2. The output terminal of the amplifier 33-2 is directly connected to one input terminal of an OR circuit 36. The variable resistor 33-1 and the amplifier 33-2 form an instantaneous characteristic circuit 33.

The variable resistor 34-1 and the amplifier 34-2 form a short time delay circuit 34. The output terminal of the amplifier 34-2 is connected to one of the terminals of the resistor 34-3. The other end of the resistor 34-3 is connected to a negative line N through a capacitor 34-4, and further to the noninverting input terminal of an operational amplifier 34-6. The inverting input terminal of the operational amplifier 34-6 is connected to a sliding terminal of a variable resistor 34-5. The fixed terminals H and L of the variable resistor 34-5 are connected to the positive and negative lines P and N, respectively. The output terminal of the operational amplifier 34-6 is connected to the second input terminal of the OR circuit 36.

A variable resistor 35-1 and an operational amplifier 35-2 form a long time delay characteristic circuit 35. The output terminal of the operational amplifier 35-2 is connected through a resistor 35-3 to the base of a transistor 35-5. The collector of the transistor 35-5 is connected to the positive line P via a resistor 35-4, and the emitter thereof is directly connected to the negative line N.

The output terminal of the squaring device 35-6 is connected to one of the ends of a resistor 35-7 of which the other end is connected to one end of an FET 35-8 and one end of a capacitor 35-10, and a + input of an operational amplifier 35-12. The other input terminal of the operational amplifier 35-12 is connected to the negative line N. The gate of the FET 35-8 is connected to the collector of the transistor 35-5, while the other end to one end of a resistor 35-9. The other end of the capacitor 35-10 is connected to one end of a resistor 35-11. The other ends of resistors 35-9 and 35-11 are connected together to the positive power source terminal of the operational amplifier 35-12. The output terminal of the operational amplifier 35-12 is connected to the noninverting input terminal of an operational amplifier 35-14. The inverting input terminal of the operational amplifier 35-14 is connected to a sliding terminal C of a variable resistor 35-13. The fixed terminals H and L of the variable resistor 35-13 and a power source terminal of the operational amplifier 35-14 are respectively connected to the positive and negative lines P and N. The output terminal of the operational amplifier 35-14 is connected to a third input terminal of the OR circuit 36. The output terminal of the OR circuit 36 is connected to the base of the transistor 14 via a resistor 13. The emitter of the transistor 14 is connected to the negative line N and the collector to the positive output terminal of the full-wave rectifier 18 through the tripping coil 15.

With such an arrangement of the circuit breaker, power is supplied from the AC single phase power source 1 to the load 4 through the circuit breaker contact 2, the main circuit 3, and the bus 17-1. The detected output generated at the first output winding 16-1 of the current transformer 16 is converted into a DC signal by the full-wave rectifier 5, and then is supplied to the resistor 21 across which it appears as a voltage signal. The capacitor 20 charges the signal generated in the output winding 16-1 to its peak, while at the same time removing noise contained in the detected signal. The constant voltage diode 55 restricts an overvoltage generated in the output winding 16-1 when a large current flows in the main circuit 3 due to a short-circuiting in the load 4.

The output signal from the second output winding 16-2 is converted into a DC current by the full wave rectifier 18, and is supplied through the resistor 24 to the constant voltage diode 25. A fixed DC voltage is supplied between the positive and negative lines P and N. A DC voltage appearing between the terminals of the series circuit including the constant voltage diode 25 and the resistor 24 is supplied to the tripping coil 15 through the transistor 14. The constant voltage diode 25 restricts an overvoltage generated in the output winding 16-2 when a large current flows in the main circuit 3 due to the shortcircuiting. The capacitor 23 smoothes the output from the full-wave rectifier 18 and at the same time removes the noise contained in the output.

A constant voltage appearing between the terminals of the constant voltage diode 25 is supplied as a control voltage for the overall circuit to the full-wave rectifier 30, the operational amplifier 31, the operational amplifier 32, the instantaneous characteristic circuit 33, the short time delay characteristic circuit 34 and the long time delay characteristic circuit 35.

The output from the third output winding 16-3 is rectified by the full-wave rectifier 19 to provide a fixed DC voltage between the terminals of the constant voltage diode 28. The capacitor 26 is for smoothing the signal generated at the output of the output winding 16-3 and removing noise contained in the output signal. The constant voltage diode 28 restricts an overvoltage generated in the output winding 16-3 when a large current is produced in the main circuit 3 due to shortcircuiting. A constant voltage generated between the terminals of the constant voltage diode 28 is used as a control power source for the constant current circuit 29.

In the constant current circuit 29, constant current determined by a voltage divided by the resistors 29-1 and 29-2 and a voltage delivered from the variable resistor 29-4, is produced from the amplifier circuit 29-3, and is supplied as a control current to the Hall element 17-2 of the current detector 17. A magnetic field developed in the bus 17-1 with the current flowing through the circuit breaker contact 2 is applied to the Hall element 17-2. An output voltage proportional to a magnitude of the magnetic field developed is generated in the Hall element 17-2, and is supplied to the full wave rectifier 30. When the output voltage of the Hall element 17-2 is positive, the amplifier circuit 30-4 operates as an inverting amplifier, the diode 30-6 is in a shortcircuited state, and the diode 30-7 is in a shut-off state. A negative side output voltage of the amplifier 30-4, which is dependent on a ratio of the resistors 30-1 and 30-3, appears on the anode of the diode 30-6. A positive input signal is supplied to the amplifier circuit 30-10 through the resistor 30-2. The signal inverted to the negative side by the amplifier circuit 30-4 is inverted again at a ratio of the resistors 30-8 and 30-9, and appears as a positive signal at the output terminal of the amplifier circuit 30-10. The positive input signal applied through the resistor 30-2 is inverted at a ratio of the resistors 30-2 and 30-9 and appears as a negative signal at the output terminal of the amplifier circuit 30-10. Accordingly, the sum of the signal inverted to the negative side by the amplifier 30-4 and the input signal supplied through the resistor 30-2, appears at the output of the amplifier circuit 30-10. Usually, the values of the related resistors are so selected that the positive signal appears at the output terminal of the amplifier circuit 30-10.

When the output signal of the Hall element 17-2 is negative, the amplifier circuit 30-4 operates as an inverting amplifier circuit. Accordingly, its output is inverted and the diode 30-6 is in a shut-off state, and the diode 30-7 is in a shortcircuted state. In this way, the input and output terminals of the amplifier circuit 30-4 are shortcircuited by the diode 30-7, so that no signal is applied to the inverting input terminal of the amplifier 30-10 through the resistor 30-8. Receiving the signal supplied through the rectifier 30-2, the amplifier circuit 30-10 produces at the output terminal the signal inverted to the positive side and determined by a ratio of the resistors 30-2 and 30-9.

In this way, the output from the full-wave rectifier 30 thus obtained is supplied to the noninverting input terminal of the amplifier circuit 31-2 through the resistor 31-1. The amplifier circuit 31-2 operates as a noninverting amplifier to provide an output voltage determined by a ratio of the resistors 31-3 and 31-4. An amplification factor of the amplifier circuit 31-2 is so selected that, up to 1,000 A, for example, of the current flowing through the main circuit 3, the signal voltage across the series circuit of the resistor 21 and the diode 22-3 detected from the output winding 16-1 is larger than the output voltage of the amplifier circuit 31-2, which is dependent on the output signal of the Hall element 17-2 of the current detector 17. Accordingly, in the region where the current of the main circuit 3 is below 1,000 A, the signal voltage across the series circuit of the resistor 21 and the diode 22-3 is input to the amplifier circuit 32 through the diode 22-1. The forward voltage drop across the diode 22-1 is cancelled by the forward voltage drop across the diode 22-3. Then, the voltage across the resistor 21 is input to the amplifier circuit 32.

In the 1,000 A or more region of the current flowing through the main circuit 3, the output voltage of the Hall element 17-2 becomes sufficiently larger than the noise voltage, and the output voltage of the Hall element 17-2 is supplied through the diode 22-2 to the amplifier circuit 32. The output level of the amplifier circuit 32 is adjusted so as to coincide with the signal level of the tripping characteristic circuit connected succeeding to it. The output voltage of the amplifier circuit 32 is supplied to the characteristic circuit 33 to 35. The variable resistor 33-1 in the instantaneous characteristic circuit 33 is set to have an instantaneous characteristic for the current value. The reference voltage thus set is supplied to the inverting input terminal of the amplifier circuit 33-2. The variable resistor 34-1 is for a current setting in the short time delay characteristic. The reference voltage obtained by the variable resistor is supplied to the inverting input terminal of the amplifier circuit 34-2. The variable resistor 34-5 is for a time setting in the short time delay characteristic, and the reference voltage obtained is supplied to the inverting input terminal of the amplifier circuit 34-6. The variable resistor 35-1 is for a current setting in the long time delay characteristic, and the reference voltage obtained is applied to the inverting input terminal of the amplifier circuit 35-2. The variable resistor 35-13 is for time setting in the long time delay characteristic, and the reference voltage obtained is applied to the inverting input terminal of the amplifier circuit 34-14.

When the current value of the main circuit 3 exceeds 1,000 A, for example, to be in an abnormal state, the output voltage of the amplifier circuit 32 is above the reference voltage set up for the instantaneous characteristic circuit 33. Then, the amplifier circuit 33-2 produces an output as a tripping signal to the base of the transistor 14 via the OR circuit 36 and the resistor 13. In turn, the transistor 14 is turned on to energize the tripping coil 15 and to open the contact 2.

When the output voltage of the amplifier circuit 32 exceeds the reference voltage of the short time delay circuit 34, the amplifier circuit 34-2 produces an output which then is applied to a time constant circuit composed of the resistor 34-3 and the capacitor 34-4. When the terminal voltage across the capacitor 34-4 exceeds the reference voltage as given by the variable resistor 34-5, the amplifier circuit 34-6 produces an output signal and to energize the tripping coil 15.

When the output voltage of the amplifier circuit 32 is above the reference voltage of the long time delay characteristic circuit 35, the amplifier circuit 35-2 applies its output to the base of the transistor 35-5 which in turn is turned on. When the collector potential of the transistor 35-5 drops, the FET 35-8 is turned off. Then, the amplifier circuit 35-12 starts the integration of the output signal of the squaring device 35-6. With the charge of the capacitor 35-4, when the output voltage of the amplifier circuit 35-12 exceeds the reference voltage set by the variable resistor 35-13, the amplifier circuit 35-14 applies an output signal to the OR circuit 36 which in turn energizes the tripping coil 15.

As seen from the above, with the combination of three output windings 16-1 and 16-3 and the current detector 17 using the Hall element 17-2, the current detecting in the main circuit 3 in a low current region is performed by the output signal from the output winding 16-1; the same in the large current region by the Hall element 17-2. Since the Hall element 17-2 is not saturated even with the large current, a linearity in the current detecting is secured over a wide range. This implies that since no wide linearity is required for the current detecting by the output winding 16-1, there is no need for using a large core of the current transformer 16. In addition to this, a number of turns of the output winding is not large and therefore the secondary side of the current transformer 16 is simple.

The output voltage of the output winding 16-2 is used for a power source for the characteristic circuits 30-35. Therefore, the output of the current transformer 16 may be the saturated one, allowing use of a small core and a small number of turns of the secondary windings. Even when a large current flows in the main circuit 3 due to shortcircuiting, for example, the current transformer 16 is saturated to limit the overvoltage at the output side. Further, the large current never gives an overvoltage at the output of the Hall element 17-2, resulting in a simple circuit construction. Furthermore, the rated power for the resistor 21 and the constant voltage diodes 25, 28 and 55 are also small, leading to the compactness of the circuit.

The control current to the Hall element 17-2 is supplied from the output winding 16-3. The output voltage of the Hall element 17-2 is supplied to the stage succeeding to the output winding 16-2. Therefore, the insulation between the input and output of the Hall element 17-2 is easily attained thereby to prevent the interference among the different potentials and to provide a stable operation. The 0 volt level of the detected current signal is equal to the 0 volt level of the circuit power source. Therefore, the circuit operation is little influenced by a voltage variation of the power source voltage.

Figure 2:
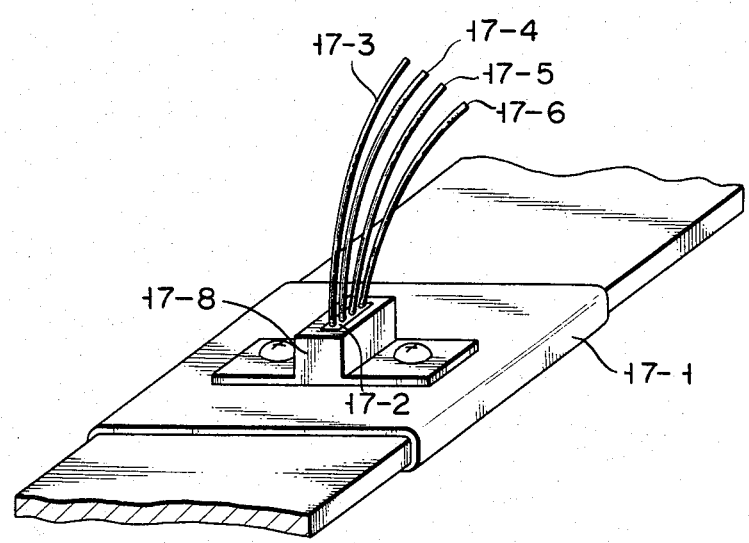
FIGS. 2 and 3 schematically illustrate a structure of a current detector used in the device of FIGS. 1A, 1B.
Figure 3:
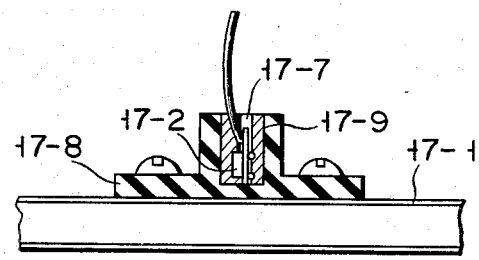

FIG. 2 illustrates a state that the Hall element 17-2 in the current detector 17 is attached to the bus 17-1 with a clad insulation in the embodiment shown in FIG. 1. Here, the control current is fed to the terminals 17-3 and 17-4, while the Hall element output voltage is taken out from the terminals 17-5 and 17-6. In FIG. 3, there is illustrated a cross sectional view of the current detector 17 in FIG. 2, in which it is assembled into a case 17-8 made of insulating material and fixed by a compound 17-9. As described above, the current detector 17 using the Hall element is very compact and can detect the current without a so-called magentic ring. Therefore, there is provided a cheap circuit breaker with a simple construction.

Figure 4A:
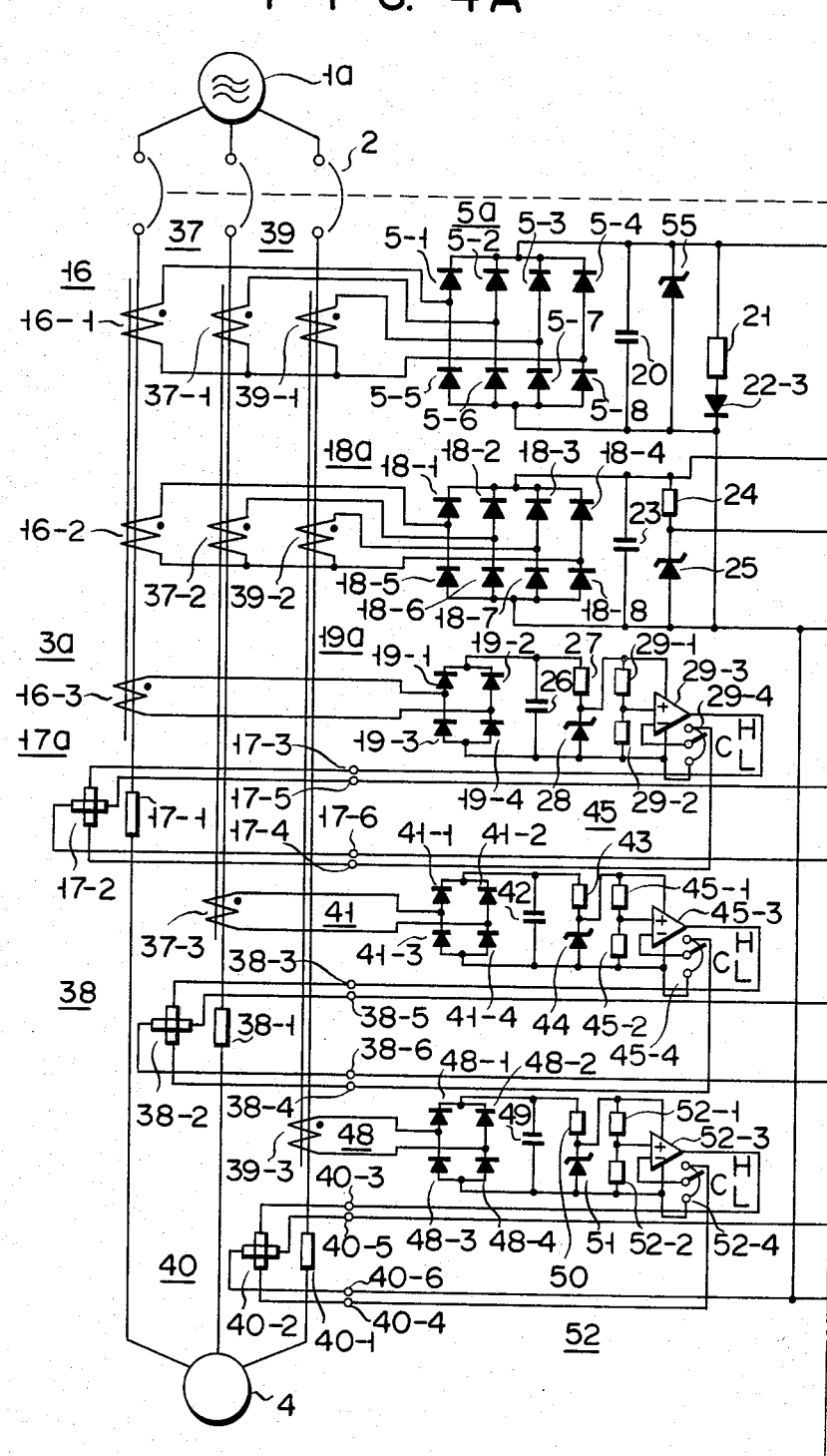
FIGS. 4A to 11 illustrate circuit arrangements of other embodiments of a circuit breaker according to the present invention.
Figure 4B:
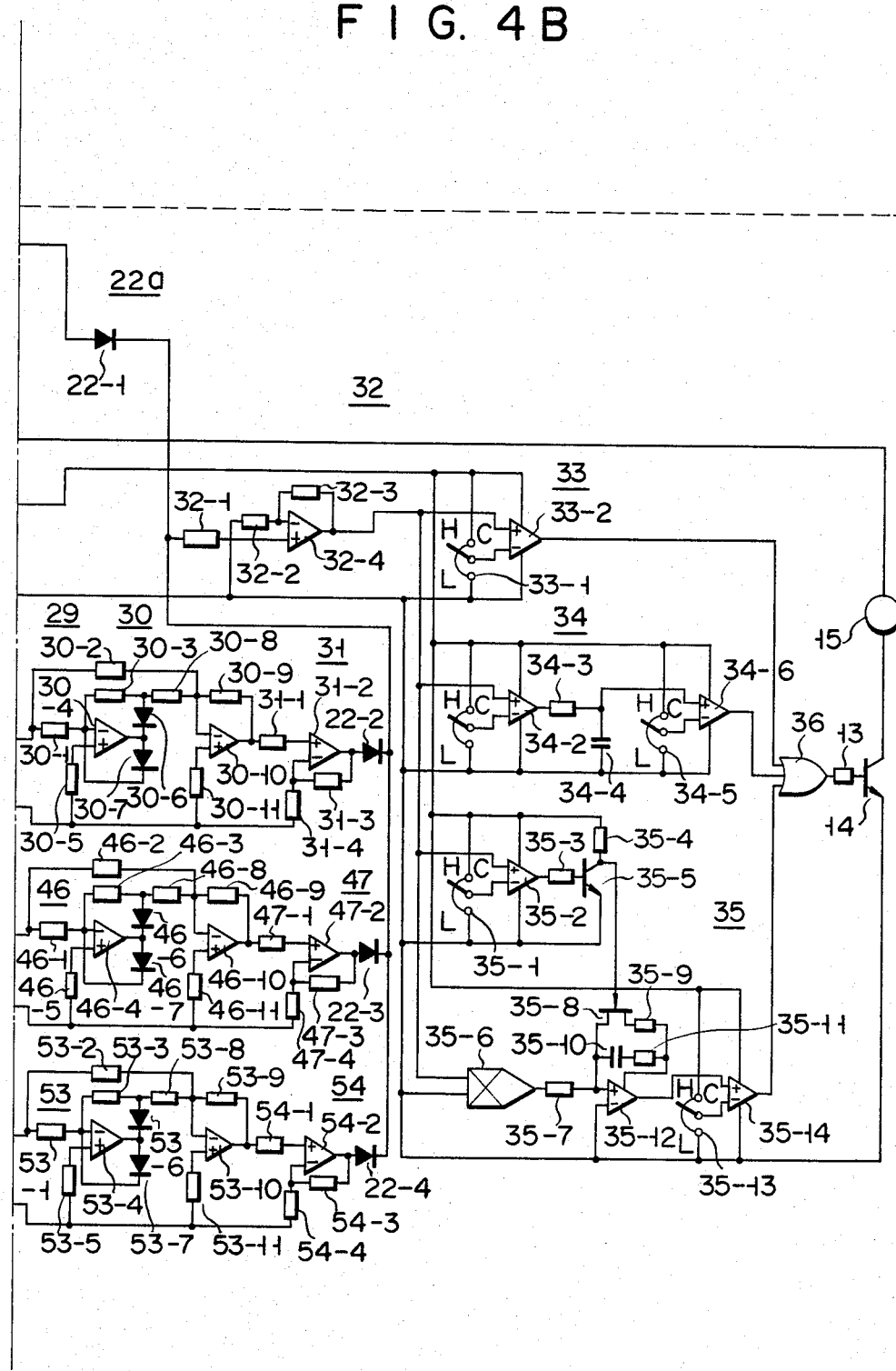

FIGS. 4A, 4B illustrate another embodiment of a circuit breaker according to the present invention. In this embodiment, the embodiment of FIGS. 1A, 1B is applied for a three-phase circuit. Current transformers 37 and 39 are additionally used. The current of the R-phase in the main circuit is detected by the first output winding 16-1 of the current transformer 16 which is connected to the R-phase. The currents of the S- and T-phases are respectively detectetd by the output windings 37-1 and 39-1 provided in a similar way. The output signals detected are rectified by a 3-phase full-wave rectifier 5a composed of diodes 5-1 to 5-8, and then are converted into a voltage signal by the combination of a resistor 21 and a diode 22-3, and finally applied to the select circuit 22a. The output voltages from the output windings 16-2, 37-2 and 39-2 are rectified by a 3-phase full wave rectifier 18a composed of diodes 18-1 to 18-8, and supplied to the constant voltage diode 25 via a resistor 24 which in turn provides a control DC voltage thereacross. The detected R-phase output from the output winding 16-3 is rectified by the full wave rectifier 19a and applied to a resistor 27 which then provides a constant voltage across the constant voltage diode 28.

The terminal voltage of the constant voltage diode 28 is used as a power source voltage of the constant current circuit 29, and a control current is supplied to the Hall element 17-2. The output voltage of the Hall element 17-2 is rectified by the full wave rectifier 30 and supplied as a detected R-phase signal to the amplifier circuit 32.

Similarly, the currents of the S- and T-phases are detected by the Hall elements 38-2 and 40-2, and are rectified by full-wave rectifiers 46 and 53, and then amplified by amplifier circuits 47 and 54, and finally supplied to the amplifier circuit 32. The remaining circuit and the operation thereof are the same as those of the FIG. 1 circuit.

The 3-phase circuit also uses the current transformers 16, 37 and 39 each with three output windings and the Hall elements 17-2, 38-2 and 40-2. Large and small currents flowing through the main circuit 3a are detected by the different circuitries, respectively. Thus, a good linearity is secured over a wide range. The basic circuit operation of this embodiment is the same as that of FIG. 1, and hence no further explanation on this embodiment is required.

Figure 5A:
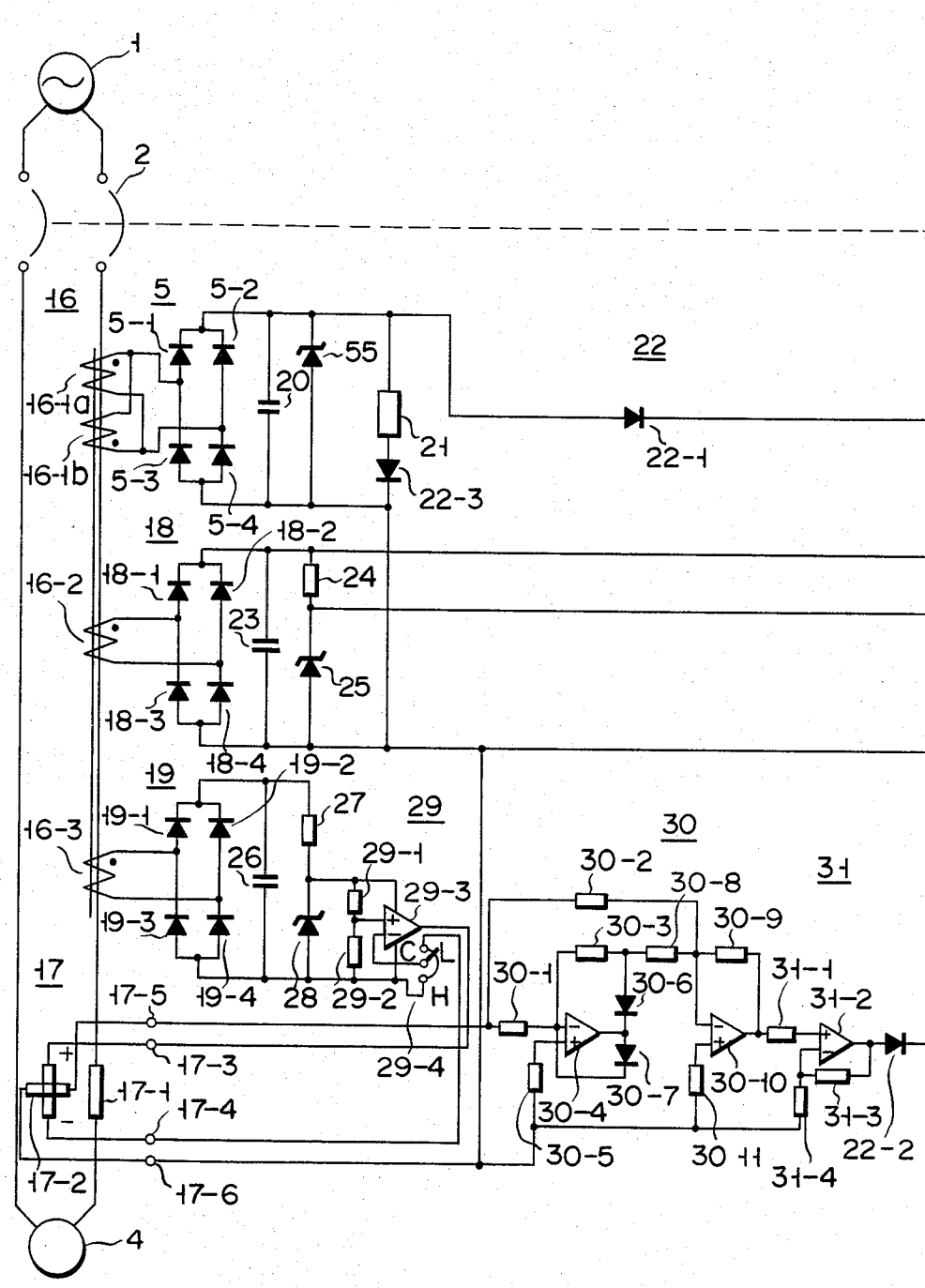
Figure 5B:
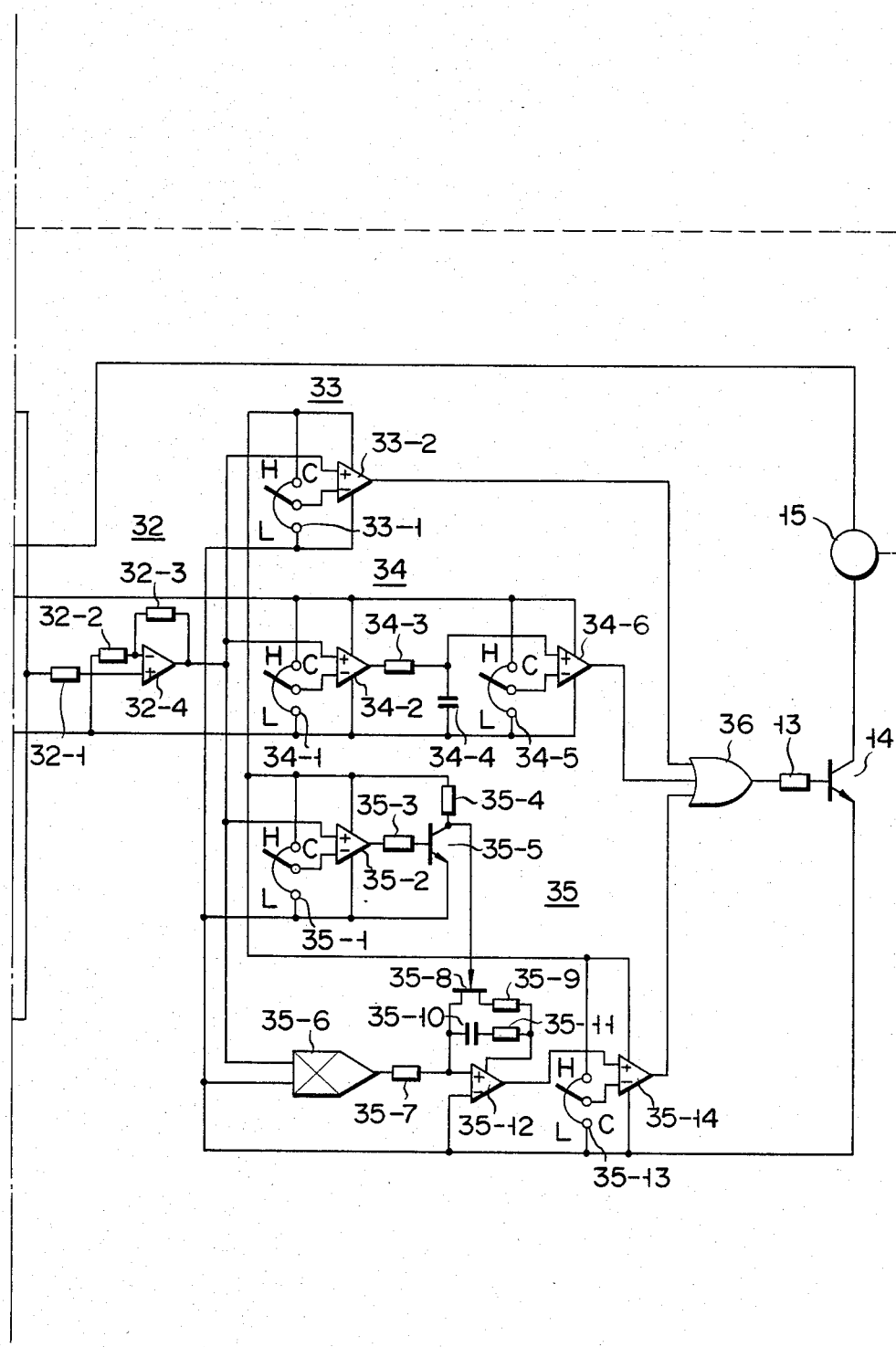

Turning now to FIGS. 5A, 5B, there is shown a third embodiment of a circuit breaker according to the present invention. This embodiment is characterized in that the first output winding of the current transformer 16 in FIG. 1 is of the differential type using a couple of windings 16-1a and 16-1b. These windings 16-1a and 16-1b have opposite winding directions. Accordingly, a current as given by a difference between the numbers of turns of the windings is supplied to the resistor 21 and the diode 22-3. In this case, those windings are of the differential type, required is only a difference output at a given level, so that the number of turns of those windings 16-1a and 16-1b may be reduced. Even if the output signal value is small, there is no need for increasing the number of turns. Thus, when the differential type output winding is employed, even when a large current flows through the main circuit 3, there is never produced an overvoltage. The result is that the rated power of the resistor 21 and the diode 22-3, and the constant voltage diode 55 may be lessened, and the size thereof may also be reduced.

Figure 6A:
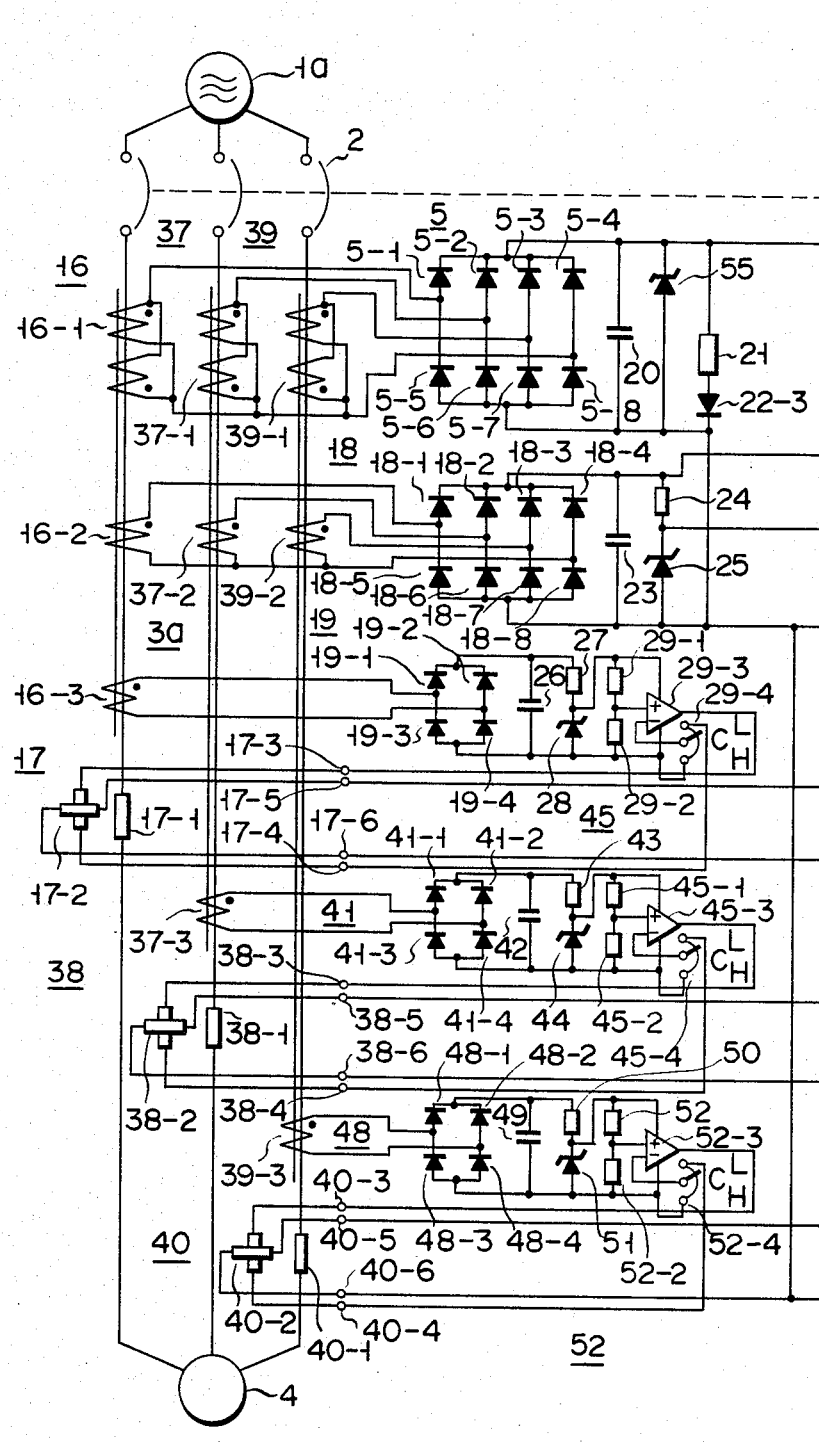

FIGS. 6A, 6B show still another embodiment of a circuit breaker according to the present invention in which the single-phase circuit breaker shown in FIGS. 5A, 5B is applied to a three-phase circuit breaker. In this embodiment, the first output windings 16-1, 37-1, and 39-1 of current transformers 16, 37 and 39 are of the differential type. This embodiment also may attain the compactness of the overall circuit arrangement.

Figure 7A:
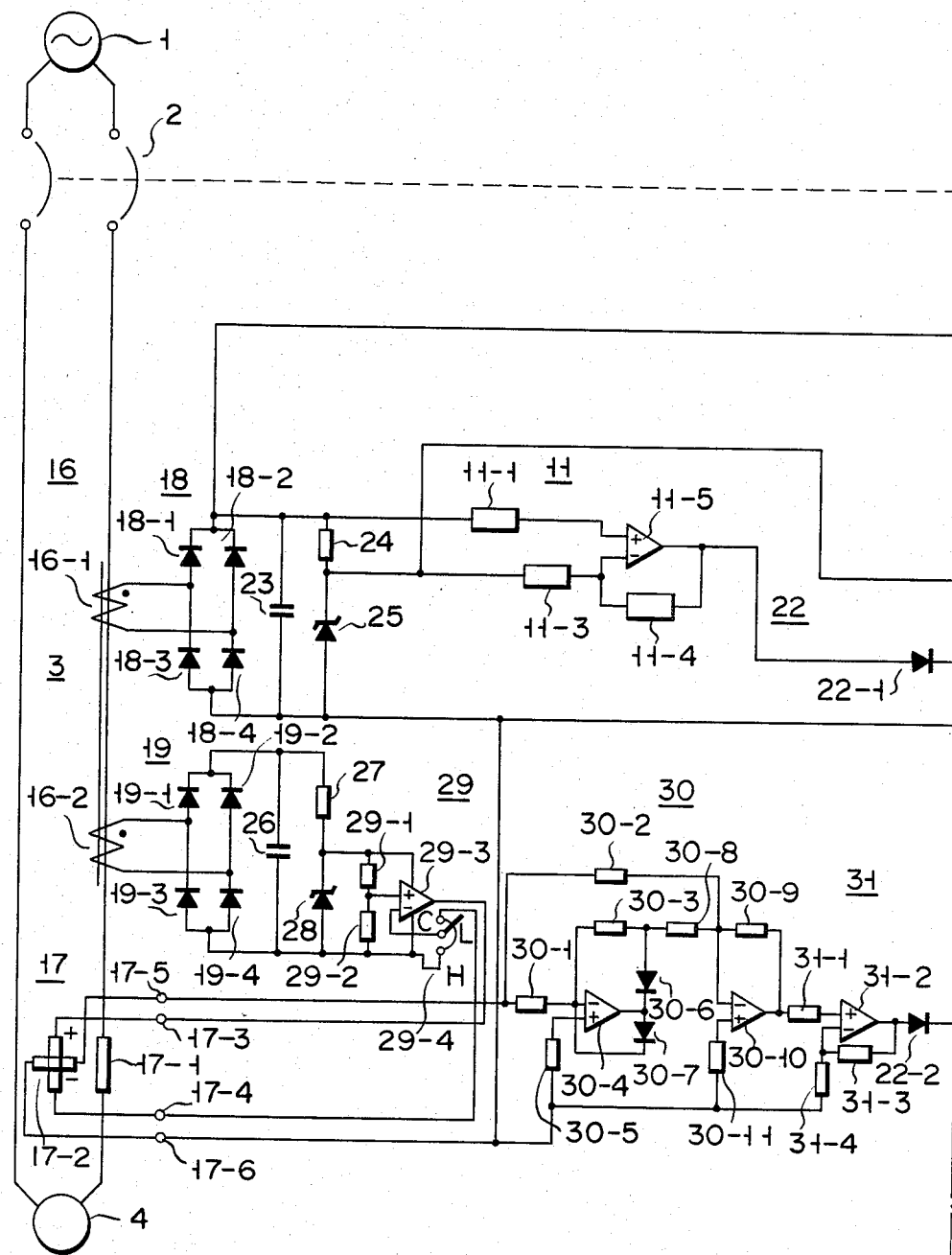

FIGS. 7A, 7B show a further embodiment of a circuit breaker according to the present invention. In this embodiment, omitted are the full wave rectifier 5, the third output winding 16-3, the capacitor 20, the constant voltage diode 55, the resistor 21, and the diode 22-3 in the first embodiment. In this embodiment, the detecting of the relatively small current in the main circuit 3 is performed by detecting the terminal voltage across a resistor 24 on the output side of the current transformer 18. The terminal voltage across the resistor 24 is connected to the inverting and noninverting input terminals of the operational amplifier 11-5, via resistors 11-1 and 11-3. A resistor 11-4 is inserted between the output terminal and the inverting input terminal of the operational amplifier 11-5. The output of the amplifier circuit 11-5 is applied through a diode 22-1 to an amplifier 32. The other circuit arrangement and operation are substantially the same as those in FIGS. 1A, 1B. As seen from the drawing of this figure, the detected current signal in the small current region, the power source for control, and the power to the tripping coil 15 are obtained from the output signal from the first output winding 16-1. The output signal from the second output winding 16-2 is used as the control current source to the Hall element 17-2. This embodiment also attains substantially the same effects as those of the FIGS. 1A, 1B embodiment.

Figure 8A:
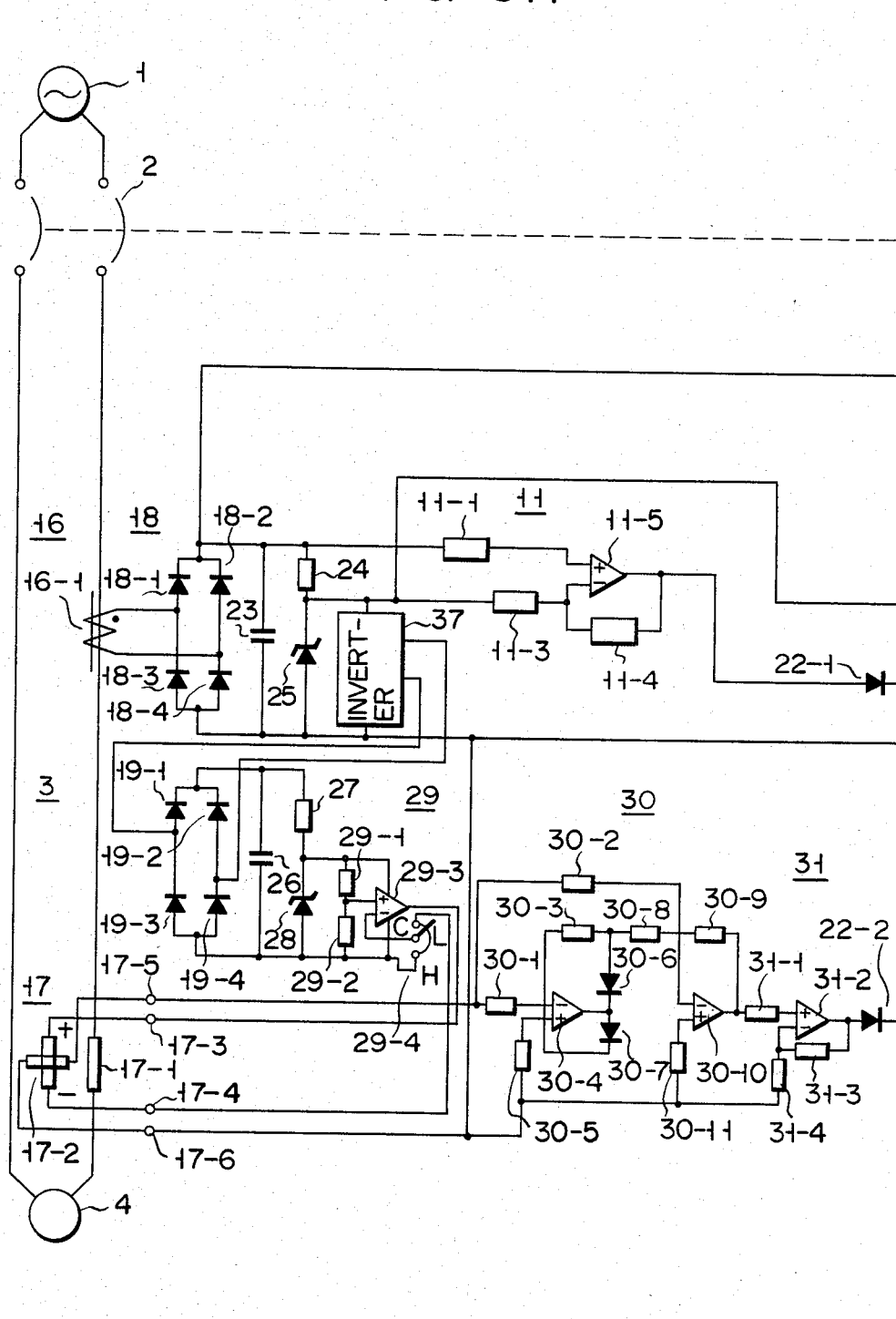
Figure 8B:
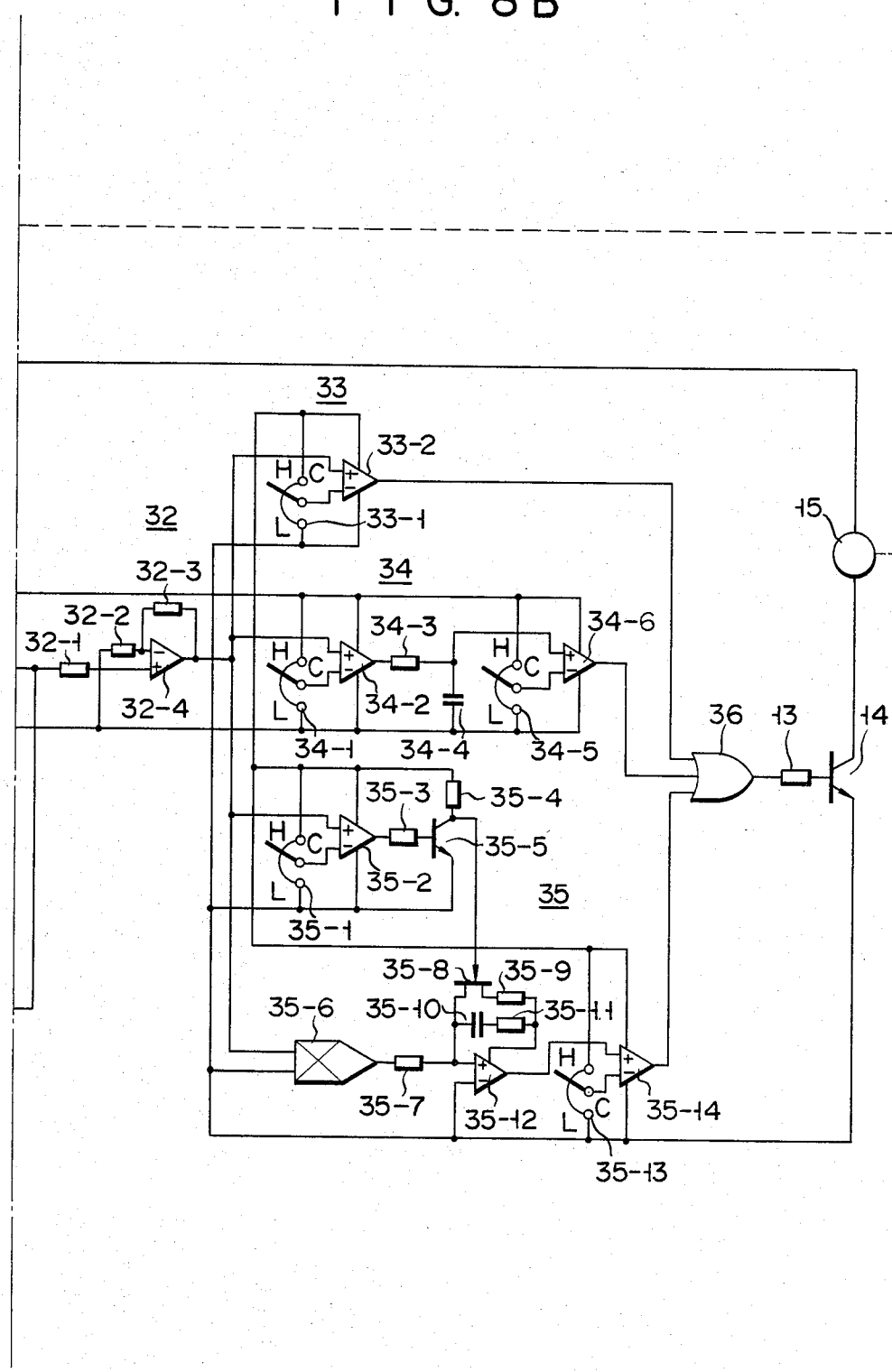

An additional embodiment of a circuit breaker according to the present invention will be given referring to FIGS. 8A, 8B. The second output winding 16-2 used in the FIGS. 7A, 7B embodiment is omitted in this embodiment. An AC input to the full-wave rectifier 19 is obtained from the inverter 37 coupled in parallel with the constant voltage diode 25. The other circuit arrangement and operation of this embodiment are substantially the same as those in the FIGS. 7A, 7B embodiment. No further explanation will be given.

As described above, for detecting a small current in the main circuit, the first output winding of the current transformer is used, while for detecting a large current, the current detector using a Hall element is used. With such an arrangement, if the current in the main circuit is large, the output of the current detector can keep its linearity. Therefore, an effective range of detecting an overcurrent is widen to enable an accurate detection of even an excessive current containing a large DC component, which is caused by a shortcircuiting, for example. Thus, the accuracy in detecting an overcurrent is improved. An adjusting range for the current detection may be widen because of its wide linearity. Further, the feature that there is no need for a wide range of the current detection by the current transformer, allows the use of a small core of the current transformer and a small number of turns of the secondary winding. This makes the current transformer compact. Further, in such a situation that the shortcircuiting causes a large current to flow through the main circuit, the saturation in the current transformer restricts the generation of an overvoltage. The result is the reduction of the rated power and the size reduction of the electronic parts connected to the secondary winding of the current transformer, and the compactness of the overall circuit. Further, the 0 volt level of the detected signal may be set to be equal to the 0 volt level of the power source.

There is eliminated an erroneous operation arising from a power voltage variation. This improves the performance of particularly of the long time delay characteristic circuit requiring a high accuracy. Thus, the number of ampare frames of the circuit breaker may be as small as possible, providing an easy standardization of the circuit breakers in their manufacturing. With the above useful features of the invention, the circuit breaker of the invention is reliable, compact and econimical.

Figure 9:
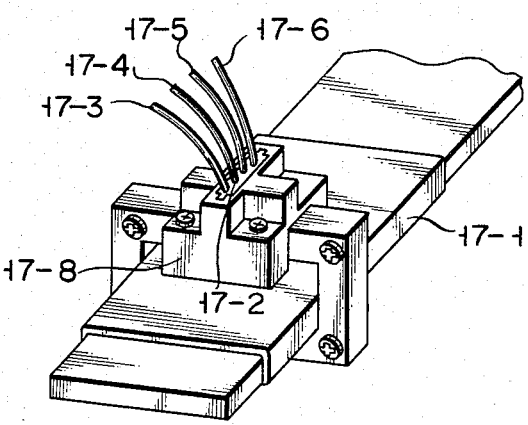
Figure 10:
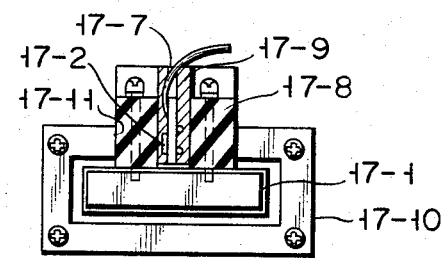
Figure 11:
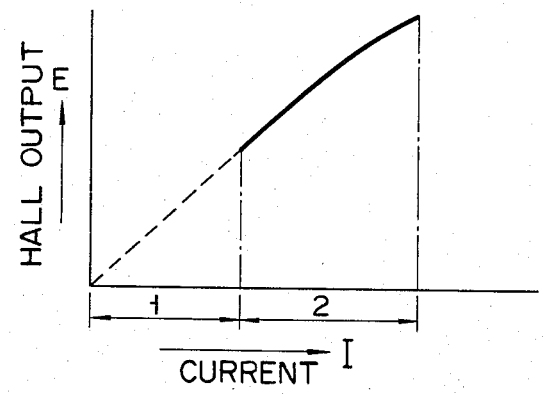

A yet another embodiment of a circuit breaker according to the present invention are illustrate in FIGS. 9 and 10. As shown, the Hall element 17-2 in the current detector 17 is mounted in a gap 17-11 of a magnetic ring 17-10 with an air gap, as shown in FIG. 10. Reference numerals are applied to like or equivalent portions in FIGS. 2 and 3. In FIGS. 9 and 10, the Hall element 17-2 is assembled into the case 17-8 made of insulating material and is fixed by the compound 17-9, like the embodiment of FIGS. 2 and 3. With this arrangement of FIGS. 9 and 10, a current below 1,000 A is detected by the output winding 16-1 in the current transformer 16, as in the previous case. The detection of a current above 1,000 A is made by the Hall element 17-2. An output current characteristic of the amplifier circuit 32 is as shown in FIG. 11. The current as indicated by a broken line is detected by the output winding 16-1 of the current transformer, and the current as indicated by a solid line is by the Hall element 17-2. In this case, by selecting a physical dimension of the gap 17-11 of the magnetic ring 17-10 according to the output characteristic of the Hall element 17-2, the characteristic as indicated by the solid line can easily be obtained. For example, in a case with a large saturation magnetic flux density but small output, like a Ga-AS Hall element, the gap 17-11 of the magnetic ring 17-10 may be shortened. In the case of an In-Sb with a small saturation magnetic flux density but large output, the gap 17-11 is set longer, to have the solid line characteristic of FIG. 11. This embodiment is applicable for any types of Hall elements such as Ga-As, In-Sb and the like, by appropriately selecting the length of the gap of the magnetic ring 17-10.

What is claimed is:

1. A circuit breaker comprising:
   an overcurrent tripping device including a first current detector containing a current transformer for detecting a current in a main circuit in a low current region, a second current detector using a Hall element for detecting a current in said main circuit in a larger current region than for said first current detector, and a tripping coil; and
   means for supplying the output of said current transformer as a control power source for said overcurrent tripping device, an exciting power source for said tripping coil, and a control current source for said Hall element.

2. A circuit breaker according to claim 1, wherein said Hall element is directly mounted to a primary conductor in said main circuit with an insulating material disposed therebetween, without a magnetic ring.

3. A circuit breaker according to claim 1, wherein said Hall element is provided within a gap of a magnetic ring with the gap, a primary conductor is passed through said magnetic ring, and said magnetic ring is fixed onto said primary conductor through an insulating material disposed therebetween.

4. A circuit breaker according to any one of claims 1, 2 or 3, in which said current transformer includes a first output winding for providing the output of said first current detector, a second output winding for providing a control power source for said overcurrent tripping device and the exciting power source for said tripping coil, and a third output winding for providing a control current source for said Hall element.

5. A circuit breaker according to any one of claims 1, 2 or 3, in which said current transformer has first and second output windings differentially connected to each other.

6. A circuit breaker according to any one of claims 1, 2 or 3, in which said main circuit is a multiphase circuit, the number of said current transformers and said Hall elements are equal to the number of phases of said multiphase circuit, and said control current sources are provided independently of said current transformers.

7. A circuit breaker according to claim 1, in which said first current detector includes a current transformer with first and second output windings, a first rectifier connected across said first output winding, a series circuit including a first resistor and a constant voltage circuit, which is connected across said first output winding, means for providing a voltage across said first resistor as a first current detecting signal, means for providing the output voltage from said constant voltage circuit as a control power source for said overcurrent tripping device, and means for providing the DC output voltage from said first rectifier as a tripping power source for said overcurrent tripping device; and said second current detector includes a second rectifier connected across said second output winding of said current transformer, and means for supplying the output of said second rectifier as a control current source for said Hall element.

8. A circuit breaker according to claim 1, in which said first current detector includes a current transformer with a single output winding, a series circuit including a resistor and a constant voltage circuit, which is connected across said output winding, and means for providing the voltage across said resistor as a first current detector output; and said second current detector includes means for providing a control current from said constant voltage circuit to said Hall element.

* * * * *